(12) United States Patent
Harmon et al.

(10) Patent No.: US 12,552,280 B2
(45) Date of Patent: Feb. 17, 2026

(54) TRANSLATABLE INDUCTION CHARGING SYSTEM

(71) Applicant: FORD GLOBAL TECHNOLOGIES, LLC, Dearborn, MI (US)

(72) Inventors: Michael John Harmon, Northville, MI (US); Jacob Michael Haspiel, Ann Arbor, MI (US); Hussain Z Tajmahal, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 752 days.

(21) Appl. No.: 17/988,419

(22) Filed: Nov. 16, 2022

(65) Prior Publication Data

US 2024/0162652 A1 May 16, 2024

(51) Int. Cl.
| | |
|---|---|
| *B60L 53/38* | (2019.01) |
| *B60L 53/12* | (2019.01) |
| *B60L 53/126* | (2019.01) |
| *B60L 53/16* | (2019.01) |
| *B60L 53/30* | (2019.01) |
| *H01R 13/629* | (2006.01) |

(52) U.S. Cl.
CPC ........... *B60L 53/38* (2019.02); *B60L 53/12* (2019.02); *B60L 53/126* (2019.02); *B60L 53/16* (2019.02); *B60L 53/30* (2019.02); *H01R 13/629* (2013.01)

(58) Field of Classification Search
CPC ........ B60L 53/38; B60L 53/12; B60L 53/126; B60L 53/16; B60L 53/30; B60L 7/14; B60L 7/18; B60L 50/16; B60L 2210/10; B60L 2210/40; B60L 58/20; B60L 53/122; Y02T 90/12; Y02T 10/7072; Y02T 10/70; H02J 50/90; H02J 50/10; H01R 13/629

USPC ......................................................... 320/108
See application file for complete search history.

(56) References Cited

U.S. PATENT DOCUMENTS 5,654,621 A  *  8/1997  Seelig ..................... H02J 50/12
                                                      320/108
5,821,731 A  *  10/1998  Kuki ....................... B60L 53/14
                                                      320/108

(Continued)

FOREIGN PATENT DOCUMENTS

| CN | 106671400 A | 5/2017 | |
|---|---|---|---|
| CN | 109383314 B | * 4/2020 | ............. H02J 7/025 |
| CN | 111833536 A | 10/2020 | |

OTHER PUBLICATIONS

Ryan-Thomas Shaw, Xiaomi Mi 20W Smart Tracking Wireless Pad review, Android Authority, Sep. 13, 2020.*

(Continued)

*Primary Examiner* — Zachary L Kuhfuss
(74) *Attorney, Agent, or Firm* — David B. Kelley; Brooks Kushman P.C.

(57) ABSTRACT

An inductive charging system has an ability to translate a primary coil in three dimensions using three actuators. This permits the charging system to align a primary coil with a secondary coil despite a vehicle not being precisely positioned with respect to the charging system. The charging system utilizes three variable length legs. Each leg constrains an axis fixed to a base to remain parallel to an axis fixed to a platform while varying a distance between these axes. Each leg also provides an ability to accommodate translation of the platform parallel to these axes.

20 Claims, 5 Drawing Sheets

(56) References Cited

U.S. PATENT DOCUMENTS

| | | | | |
|---|---|---|---|---|
| 9,333,866 | B2* | 5/2016 | Proebstle | B60L 53/30 |
| 9,649,948 | B2* | 5/2017 | Bell | B60L 53/124 |
| 9,660,487 | B1* | 5/2017 | Mu | B60L 53/126 |
| 9,873,347 | B2* | 1/2018 | Brown | B60L 53/36 |
| 10,044,235 | B2* | 8/2018 | Takatsu | E04H 6/24 |
| 10,139,238 | B2* | 11/2018 | Widmer | G01C 21/3635 |
| 10,543,753 | B2* | 1/2020 | Wechsler | H02J 50/90 |
| 10,926,650 | B2* | 2/2021 | Elias | B60L 53/38 |
| 12,139,030 | B1* | 11/2024 | Booth | B60L 53/36 |
| 2015/0069967 | A1* | 3/2015 | Baarman | B60L 53/122 |
| | | | | 320/108 |
| 2016/0089987 | A1* | 3/2016 | Ichikawa | B60L 53/122 |
| | | | | 180/65.265 |
| 2021/0086639 | A1* | 3/2021 | Rakuff | B60L 53/31 |
| 2021/0197677 | A1* | 7/2021 | Terada | B60L 53/39 |
| 2023/0347757 | A1* | 11/2023 | Lethellier | H02J 50/90 |

OTHER PUBLICATIONS

Ryan-Thomas Shaw, Xiaomi Mi 20W Smart Tracking Wireless Charging Pad review, Android Authority, Sep. 13, 2020, pp. 1-11.

* cited by examiner

TRANSLATABLE INDUCTION CHARGING SYSTEM

TECHNICAL FIELD

The present disclosure relates to an inductive charging system for a vehicle. More particularly, the disclosure relates to an inductive charging system having the ability to move a coil to align it with another coil.

BACKGROUND

Battery-electric vehicles contain a traction battery assembly to act as an energy source for the vehicle. The traction battery is charged from fixed electric power source, such as an utility grid, while the vehicle is not in use. One common method of transferring electric power from the fixed source to the vehicle is via a plug-in connection. However, a plug-in connection requires an action by the user to plug in a connector after parking and then to unplug it before driving. Inductive charging provides an alternative to a plug-in connection. With inductive charging, a primary coil receives alternating current from the fixed source and establishes a changing magnetic field. The changing magnetic field induces current in a secondary coil which is attached to the vehicle. Efficient transfer of power by an inductive charging system requires accurate placement of the secondary coil relative to the primary coil. Many human drivers do not consistently park a vehicle with the degree of accuracy required for efficient inductive charging.

SUMMARY

According to one embodiment, an inductive charging system includes a base, a platform, a first coil, three posts, three carriages, and three arms. The first coil, which may be a primary coil, is fixed to the platform. The three post extend vertically from the base. Each of the three carriages move vertically along one of the posts in response to an actuator. Each of the three arms is pivotably connected at a first end to the platform and pivotably connected at a second end to one of the carriages. Each of the three arms is also slidably connected to either the carriage or the platform. A controller is programmed to align the first coil with a second coil, which may be a secondary coil, by sending commands to the actuators. The controller may translate the platform horizontally by commanding the actuators to raise at least one of the carriages and to lower at least one of the carriages. The controller may raise the platform vertically by commanding the actuators to raise all three carriages.

According to another embodiment, an inductive charging system includes a base, a platform, a first coil, three lower arms, three upper arms, and three actuators. The first coil, which may be a primary coil, is fixed to the platform. Each of the three lower arms has a first end pivotably attached to the base and a second end. Each of the three upper arms has a third end pivotably attached to the second end of one of the lower arms and a fourth end pivotably attached to the platform. Each of the three actuators is configured to vary an angle between one of the lower arms and the upper arm pivotably attached thereto. A controller is programmed to align the first coil with a second coil, which may be a secondary coil, by sending commands to the actuators. The controller may translate the platform horizontally by commanding the actuators to increase at least one of the angles and to decrease at least one of the angles. The controller may raise the platform vertically by commanding the actuators to increase all three angles.

According to another embodiment, an inductive charging system includes a base, a platform, a first coil, first and second legs, and three actuators. The base defines a first base axis, a second base axis, and a third base axis, which may intersect at 60 degree angles. The platform defines a first platform axis, a second platform axis, and a third platform axis. The first coil, which may be a primary coil, is fixed to the platform. The first leg connects the base to the platform and constrains the first base axis to remain parallel to the first platform axis while accommodating translation of the platform with respect to the base parallel to the first base axis. The second leg connects the base to the platform and constrains the second base axis to remain parallel to the second platform axis while accommodating translation of the platform with respect to the base parallel to the second base axis. A third leg may constrain the third base axis to remain parallel to the third platform axis while accommodating translation of the platform with respect to the base parallel to the third base axis. The three actuators adjust a first distance between the first base axis and the first platform axis, a second distance between the second base axis and the second platform axis, and a third distance between the third base axis and the third platform axis. A controller may align the first coil with a second coil, which may be a secondary coil, by sending commands to the actuators.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
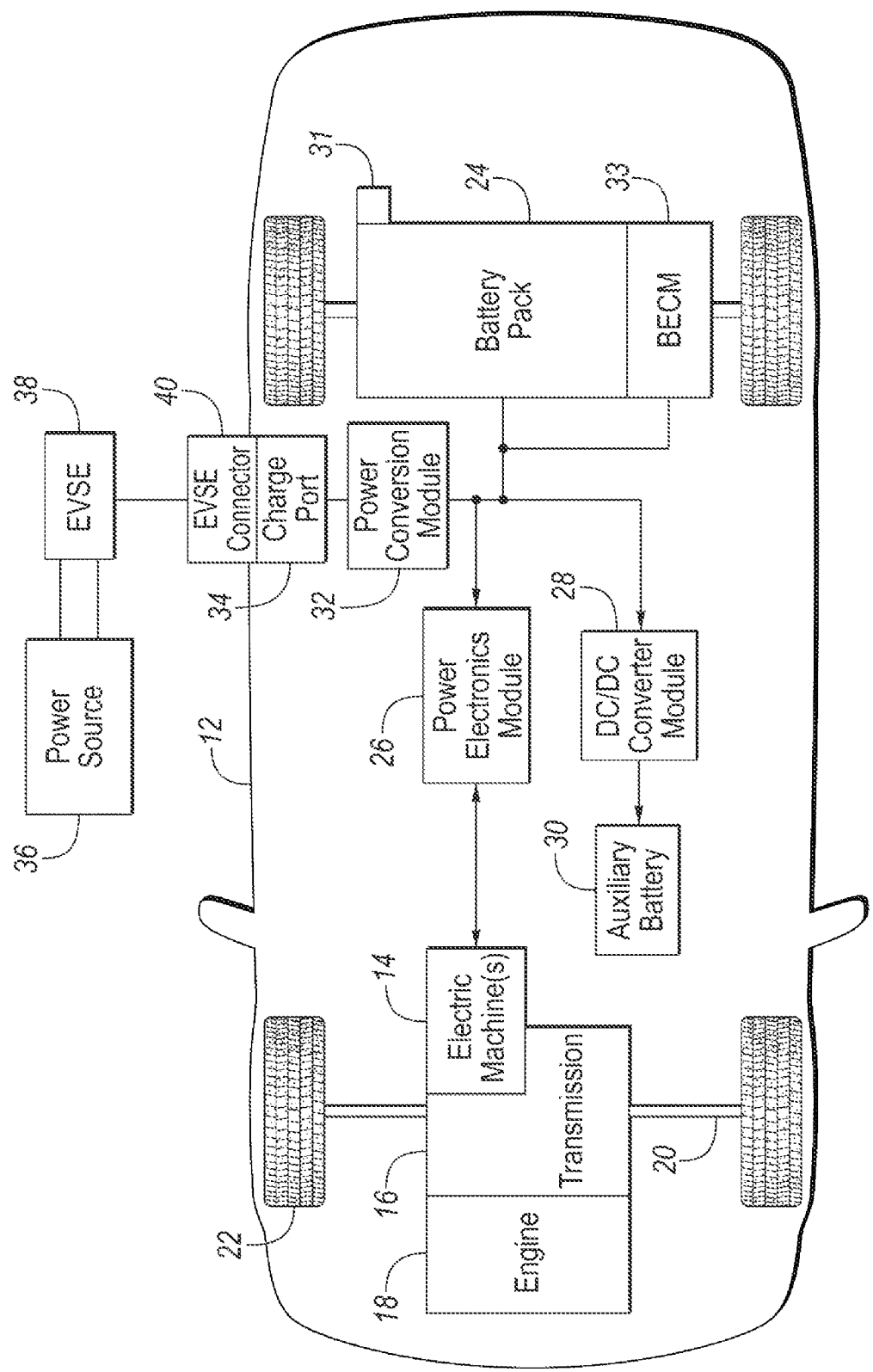
FIG. 1 is a schematic diagram of an example hybrid vehicle.

FIG. 1 depicts a schematic of a plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and braking capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays include one or more battery cells.

The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally managed with a thermal management system. Examples of thermal management systems include: air cooling systems, liquid cooling systems, and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to fully electric vehicles. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30, e.g., a 12-volt battery.

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for interfacing with a charge port 34 of the vehicle 12. The charge port 34 may be any type of port configured to transfer power from the EVSE 38 to the vehicle 12. For example, EVSE connector 40 may include a primary coil of an induction charging system and charge port 34 may include a corresponding secondary coil. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus, e.g., Controller Area Network (CAN), or via dedicated electrical conduits.

Conventionally, the primary coil of an inductive charging system is in a fixed location within a parking spot. The secondary coil is conventionally in a fixed location relative to the vehicle. Therefore, accurate placement of the secondary coil relative to the primary coil requires accurate positioning of the vehicle relative to the parking spot. The degree of accuracy required for efficient inductive charging exceeds the degree of accuracy typical of human drivers. Prior methods of improving the relative positioning have focused on providing improved guidance to the driver when parking. Even with this guidance, human drivers often mis-align the coils. The inductive charging system described below reduces the accuracy demanded of the human driver by permitting a controller to sense the location of the secondary coil and translate the primary coil as necessary to align it with the secondary coil. The system permits translation of the primary coil in three dimensions using three actuators. The mechanism is space-efficient such that it can be contained in a basin embedded in the parking surface without impeding the path into and out of a parking space.

Figure 2:
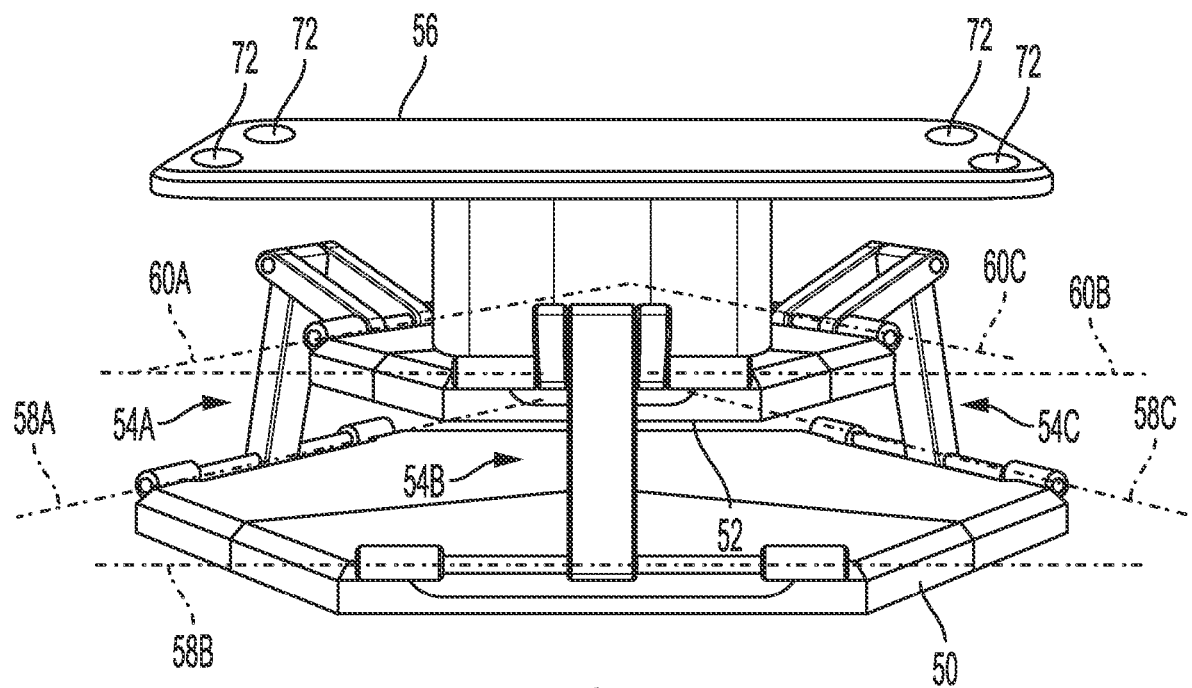
FIG. 2 is a pictorial view of a first embodiment of an inductive charging system.

FIG. 2 is a pictorial view of an inductive vehicle charging station. The station includes a base 50 which is adapted to be rigidly attached to a fixed position on or under a floor of a parking facility. A moveable platform 52 is supported above the base 50 by three legs 54A, 54B, and 54C. A primary coil 56 is fixed to the moveable platform 52. A flexible cord (not shown) conveys alternating current to the coil to create a changing magnetic field. The changing magnetic field induces an alternating current in a secondary coil that is attached to a vehicle parked above the charging station. The alternating current is processed by electronics on the vehicle to charge a battery of the vehicle. The rate at which the vehicle battery is charged is dependent on the primary coil being aligned with the secondary coil. Mis-alignment substantially reduces the rate of battery charging. To increase the rate of charging EVSE 38 may include a controller that manipulates the three legs 54A, 54B, and 54C to align the coils.

Three base axes 58A, 58B, and 58C are defined with respect to the base 50. These axes are co-planar with one another. In the embodiment of FIG. 2, the three axes intersect one another at 60 degree angles to form an equilateral triangle. Similarly, three platform axes 60A, 60B, and 60C are defined with respect to platform 52. Leg 54A constrains platform axis 60A to be parallel to base axis 58A. Similarly, leg 54B constrains axis 60B to be parallel to axis 58B and leg 54C constrains axis 60C to be parallel to axis 58C. Collectively, the three legs prevent relative rotation between base 50 and platform 52. Leg 54A permits the distance between base axis 58A and 60A to vary. As will be discussed below, an actuator permits a controller to adjust this distance. Similarly, legs 54B and 54C allow distances between axes 58B and 60B and between axes 58C and 60C to vary and include actuators that permit a controller to adjust these distances. This allows the controller to translate the platform, and therefore the coil, in two horizontal dimensions and vertically.

Figure 3:
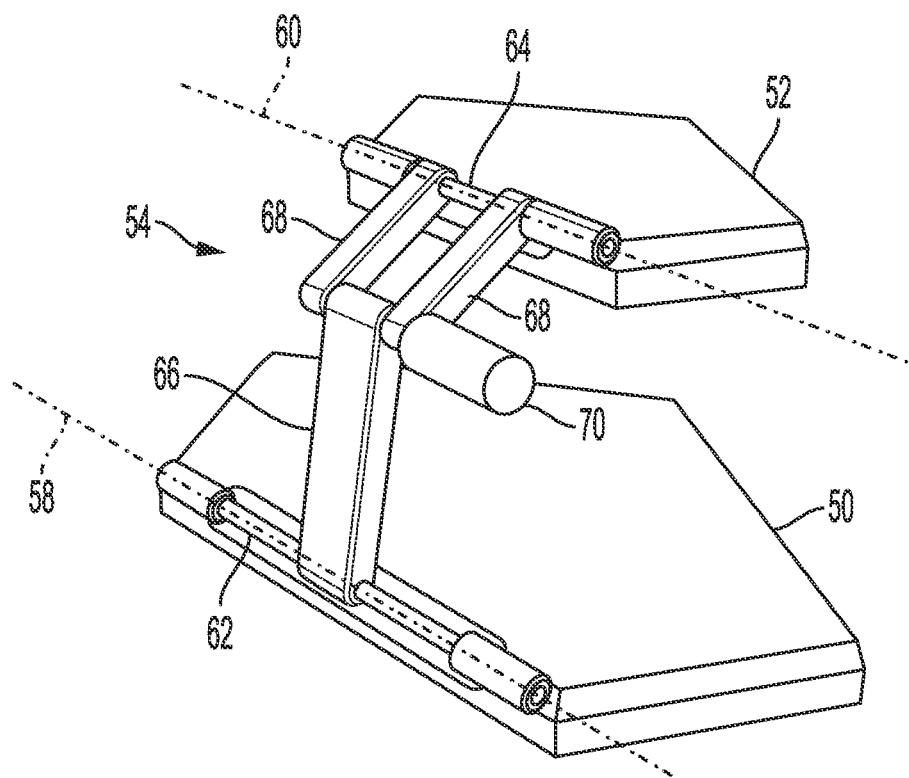
FIG. 3 is a pictorial view of a leg of the inductive charging system of FIG. 2

FIG. 3 illustrates the structure of each of the legs 54 in more detail. A lower rod 62 is fixed to the base along the base axis 58. An upper rod 64 is fixed to the platform along platform axis 60. A fixed length lower arm 66 is pivotably attached to the lower rod, but is allowed to slide along the lower rod. A fixed length upper arm 68 is pivotably attached to the upper rod. Distal ends of the lower rod 66 and the upper rod 68 are pivotably attached to one another. The sliding between lower arm 66 and pin 62 permits translation of the platform parallel to axes 58 and 60. Alternatively, the translation could be accommodated at the joint between upper arm 68 and upper rod 64. Actuator 70 adjust the angle between the lower rod and the upper rod based on a command from a controller. Adjusting this angle sets the distance between axis 58 and 60. In alternative embodiments, angle actuators may be placed along axis 58 or 60 instead. Note that the distance between axis 58 and 60 is not a function solely of the angles at these locations, but that three such actuators, one on each leg, collectively would be able to set the corresponding three distances.

After a vehicle is parked and inductive charging is requested, a controller such as EVSE 38 issues commands to the actuators to align the primary coil 56 with the secondary coil which is fixed to the vehicle. The controller may receive signals from a set of sensors 72 (FIG. 2) to determine the relative position of the secondary coil. Based on the position of the secondary coil, the controller may calculate the position of platform 52 which places primary coil 56 in alignment with the secondary coil. The controller may then calculate the angles at each of the three actuators for that platform position. Finally, the controller may command the three actuators to adjust their respective angles to the calculated values. In some embodiments, this process may be repeated multiple times to first make coarse adjustments and then progressively finer adjustments to align the coils. When battery charging is complete, the controller may command the actuators to place the platform in a stowed position in which it is less likely to interfere with moving the vehicle out of the parking space and driving another vehicle into the parking space.

Figure 4:
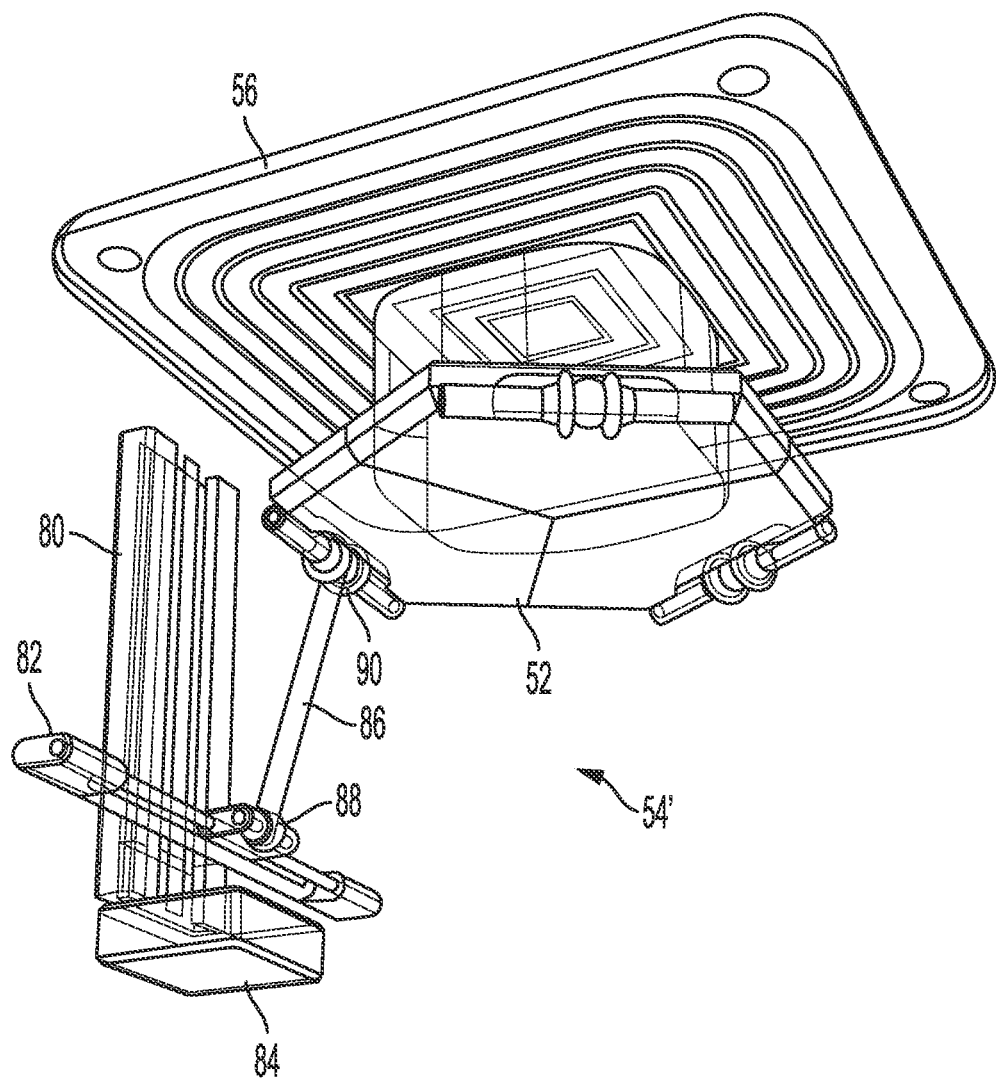
FIG. 4 is a pictorial view of a leg of a second embodiment of an inductive charging system.

FIG. 4 is a perspective view of an alternative leg mechanism 54'. A vertical post 80 is fixed to the base 50 (not shown). Carriage 82 slides vertically along post 80. Specifically, linear actuator 84 adjusts the position of carriage 82 along post 80 in response to signals from a controller. Arm 86 is pivotally attached to carriage 82 at 88 and pivotally attached to platform 52 at 90. Arm 86 is also slidably attached to carriage 82 such that it can slide in a direction parallel to the axes of rotation of the revolute joints at 88 and 90.

Figure 5:
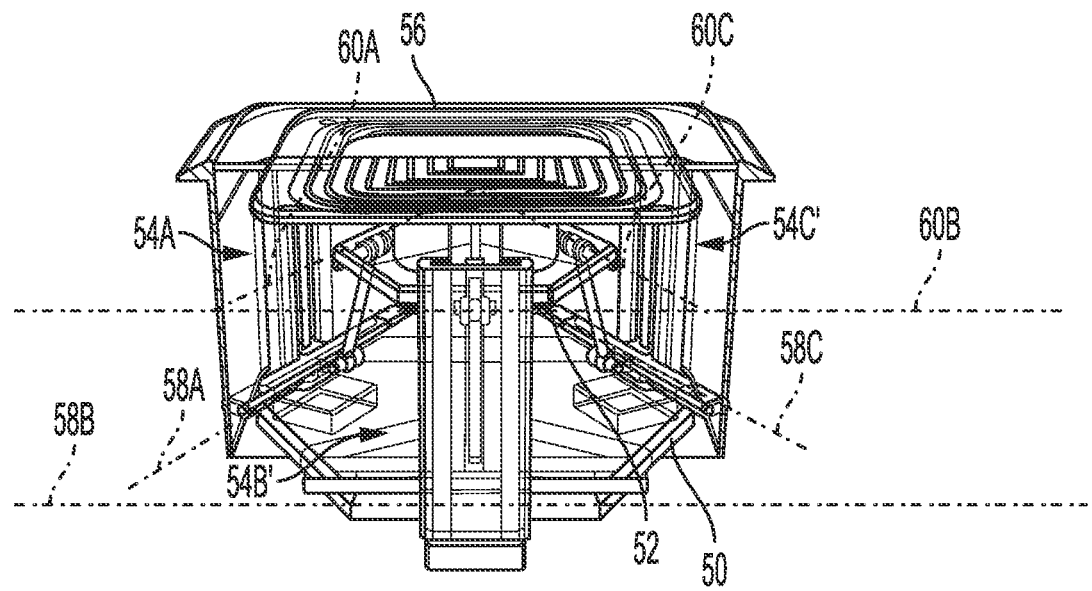
FIG. 5 is a pictorial view of the second embodiment in a stowed position.
Figure 6:
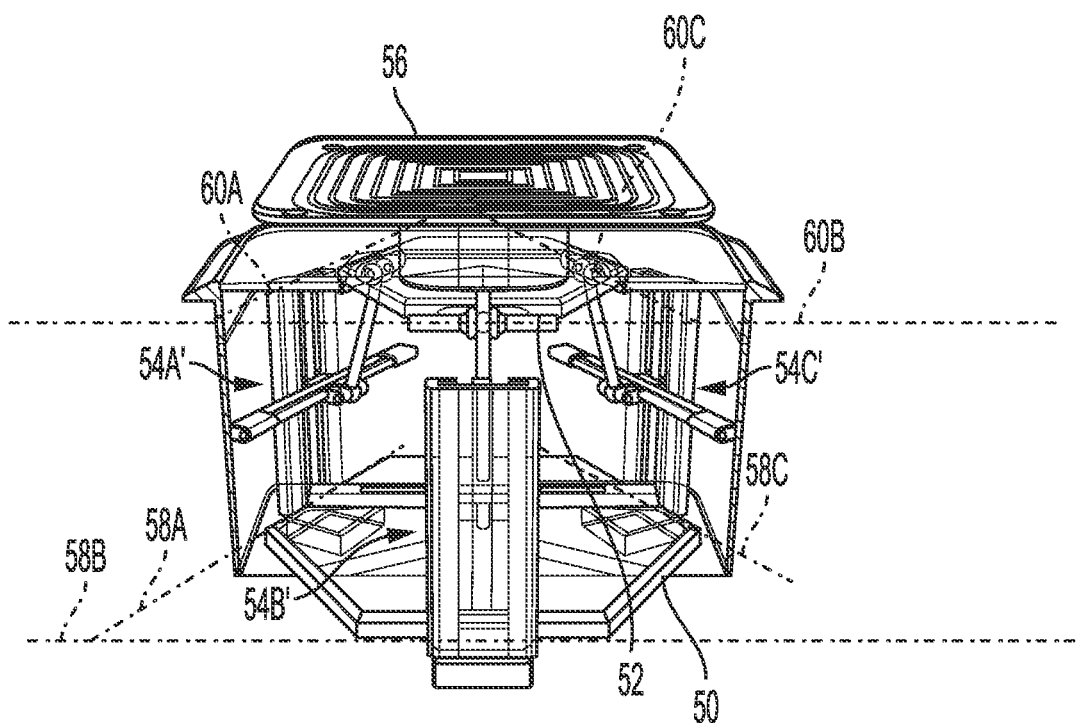
FIG. 6 is a pictorial view of the second embodiment in an extended position.
Figure 7:
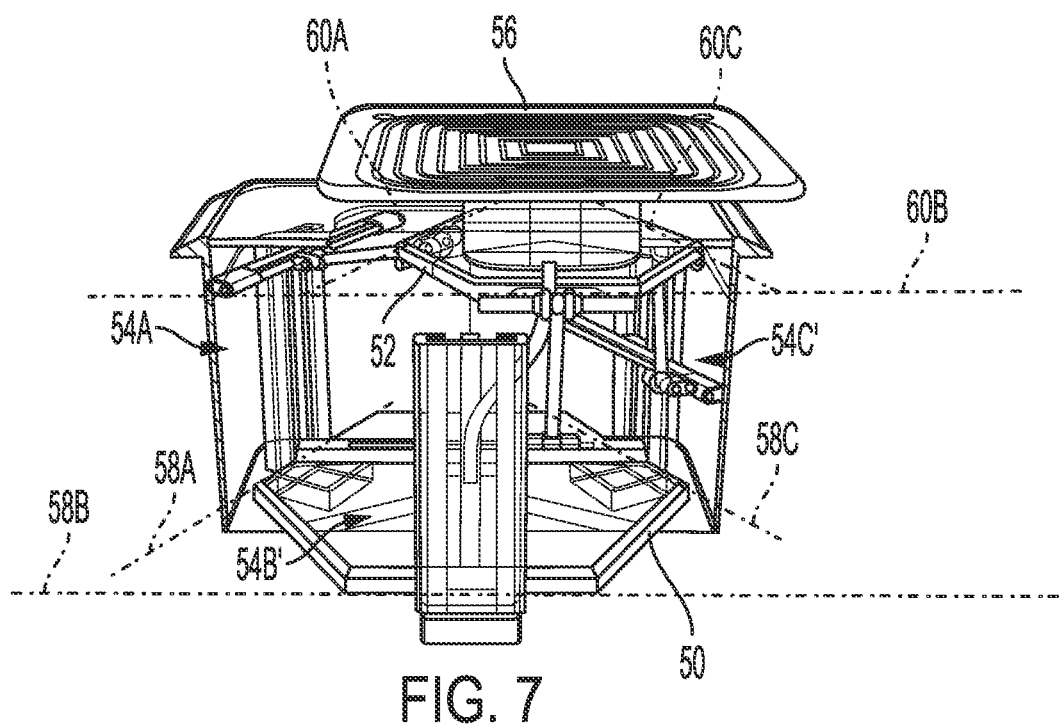
FIG. 7 is a pictorial view of the second embodiment in a horizontally translated position.

FIGS. 5-7 illustrate an inductive charging system having three legs according to FIG. 4. FIG. 5 shows the charging system in a stowed position suitable for moving a vehicle into or out of the parking space. Base 50 defines three base axes 58A, 58B, and 58C which are parallel to the axes of rotation of the corresponding revolute joints. These base axes do not move with the carriages but remain in a fixed position with respect to the base 50. Unlike the embodiment of FIGS. 2-3, the base axes are not associated with a pin. Platform 52 defines three platform axes 60A, 60B, and 60C which are parallel to (or co-incident with) the axes of rotation of the corresponding revolute joints. The platform axes move with the platform. The legs maintain parallelism between the base axes and the corresponding platform axes. Motion of the carriages along the posts varies the distances between the base axes and the corresponding platform axes. Although the distance between a particular base axis/platform axis pair is not solely determined by the position of the corresponding carriage, the three actuators collectively determine the three distances.

FIG. 6 shows the charging system in a vertically extended position which places the primary coil closer to the secondary coil. To reach this position, the three actuators are commanded to move the three carriages up the three posts by an equal amount.

FIG. 7 shows the charging system in a horizontally translated position. This horizontal translation may align the primary coil with a secondary coil even when the vehicle is not precisely positioned with respect to the parking spot. To translate the platform horizontally, one or two of the carriages are commanded to move upwards while the other one or two carriages are commanded to move downwards. (For some translation directions, one moves up while one or two go down. For other translation directions, two go up while one goes down.) Note that the arms of legs 54B' and 54C' have slid along the respective carriages relative to the respective posts. In general, every x, y, z position within the mechanisms range of motion corresponds to one combination of the carriage positions along the respective posts.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An inductive charging system comprising:
   a base;
   a platform;
   a first coil fixed to the platform;
   three posts extending from the base;
   three carriages, each configured to move vertically along one of the posts in response to an actuator; and
   three arms, each arm pivotably connected at a first end to the platform and pivotably connected at a second end to one of the carriages and slidably connected to either the carriage or the platform.

2. The inductive charging system of claim 1 further comprising a controller programmed to align the first coil with a second coil by sending commands to the actuators.

3. The inductive charging system of claim 2 wherein the first coil is a primary coil and the second coil is a secondary coil.

4. The inductive charging system of claim 2 wherein the controller translates the platform horizontally by commanding the actuators to raise at least one of the carriages and to lower at least one of the carriages.

5. The inductive charging system of claim 4 wherein the controller raises the platform vertically by commanding the actuators to raise all three carriages.

6. An inductive charging system comprising:
   a base;
   a platform;
   a first coil fixed to the platform;
   three lower arms each having a first end pivotably attached to the base and having a second end;
   three upper arms each having a third end pivotably attached to the second end of one of the lower arms and a fourth end pivotably attached to the platform; and
   three actuators each configured to vary an angle between one of the lower arms and the upper arm pivotably attached thereto.

7. The inductive charging system of claim 6 further comprising a controller programmed to align the first coil with a second coil by sending commands to the actuators.

8. The inductive charging system of claim 7 wherein the first coil is a primary coil and the second coil is a secondary coil.

9. The inductive charging system of claim 7 wherein the controller translates the platform horizontally by commanding the actuators to increase at least one of the angles and to decrease at least one of the angles.

10. The inductive charging system of claim 9 wherein the controller raises the platform vertically by commanding the actuators to increase all three angles.

11. An inductive charging system comprising:
    a base defining a first base axis, a second base axis, and a third base axis;
    a platform defining a first platform axis, a second platform axis, and a third platform axis;
    a first coil fixed to the platform;
    a first leg connecting the base to the platform and configured to constrain the first base axis to remain parallel to the first platform axis while accommodating translation of the platform with respect to the base parallel to the first base axis;
    a second leg connecting the base to the platform and configured to constrain the second base axis to remain parallel to the second platform axis while accommodating translation of the platform with respect to the base parallel to the second base axis; and
    three actuators configured to adjust a first distance between the first base axis and the first platform axis, a second distance between the second base axis and the second platform axis, and a third distance between the third base axis and the third platform axis.

12. The inductive charging system of claim 11 further comprising a third leg connecting the base to the platform and configured to constrain the third base axis to remain parallel to the third platform axis while accommodating translation of the platform with respect to the base parallel to the third base axis.

13. The inductive charging system of claim 11 wherein the three actuators include a first actuator configured to directly adjust the first distance, a second actuator configured to directly adjust the second distance, and a third actuator configured to directly adjust the third distance.

14. The inductive charging system of claim 11 further comprising a controller programmed to align the first coil with a second coil by sending commands to the actuators.

15. The inductive charging system of claim 14 wherein the first coil is a primary coil and the second coil is a secondary coil.

16. The inductive charging system of claim 11 wherein the first base axis intersects the second base axis and the third base axis at 60 degree angles.

17. The inductive charging system of claim 11 wherein the first leg comprises:
    a lower arm pivotably attached to the base along the first base axis; and
    an upper arm pivotably attached to the platform along the first platform axis; wherein
    the lower arm and the upper arm are pivotably attached to one another at fixed distances from the first base axis and the first platform axis respectively.

18. The inductive charging system of claim 17 wherein the lower arm is configured to slide with respect to the base along the first base axis.

19. The inductive charging system of claim 11 wherein the first leg comprises:
    a post;
    a carriage configured to slide along the post; and
    an arm pivotably attached to the carriage and pivotably attached to the platform along the first platform axis.

20. The inductive charging system of claim 19 wherein the arm is configured to slide with respect to the carriage parallel to the first base axis.

* * * * *